United States Patent [19]
Prochnow

[11] 3,780,635
[45] Dec. 25, 1973

[54] SPOOL HOLDER FOR ROLL FILM CAMERAS
[75] Inventor: Claus Prochnow, Braunschweig, Germany
[73] Assignee: Rollei-Werke Franke & Heidecke, Braunschweig, Germany
[22] Filed: Apr. 14, 1972
[21] Appl. No.: 244,099

[52] U.S. Cl. .............................. 95/31 CA, 95/34 R
[51] Int. Cl. .......................................... G03b 19/04
[58] Field of Search .................. 95/34 R, 31 CA, 19

[56] References Cited
UNITED STATES PATENTS
| | | | |
|---|---|---|---|
| 2,537,883 | 1/1951 | Ernisse | 95/31 CA |
| 2,716,929 | 9/1955 | Smith | 95/31 CA X |
| 3,143,050 | 8/1964 | Winkler et al. | 95/31 CA |
| 3,650,489 | 3/1972 | Bresson et al. | 95/31 CA UX |
| 3,665,829 | 5/1972 | Putscher | 95/31 CA |

Primary Examiner—Samuel S. Matthews
Assistant Examiner—E. M. Bero
Attorney—Charles Shepard

[57] ABSTRACT

A spool holder for holding a roll film supply spool and take-up spool, the holder with the spools mounted therein being insertable in or removable from an appropriate camera body constructed to receive it, or a detachable back section or cassette section of a camera body. The holder contains driving keys and mounting pins or stub shafts for both spools, the driving keys being at diagonally opposite corners of the holder. Thus the holder may be inserted in the camera body in either one of two positions, rotated 180° with respect to each other about the optical axis. When the film on the supply spool has been used up, the former supply spool now becomes the take-up spool when the holder is inserted in the camera in a position turned 180° from its former position, thus avoiding the customary step of removing the empty supply spool and re-inserting it in the camera in the take-up position.

9 Claims, 4 Drawing Figures 3,780,635

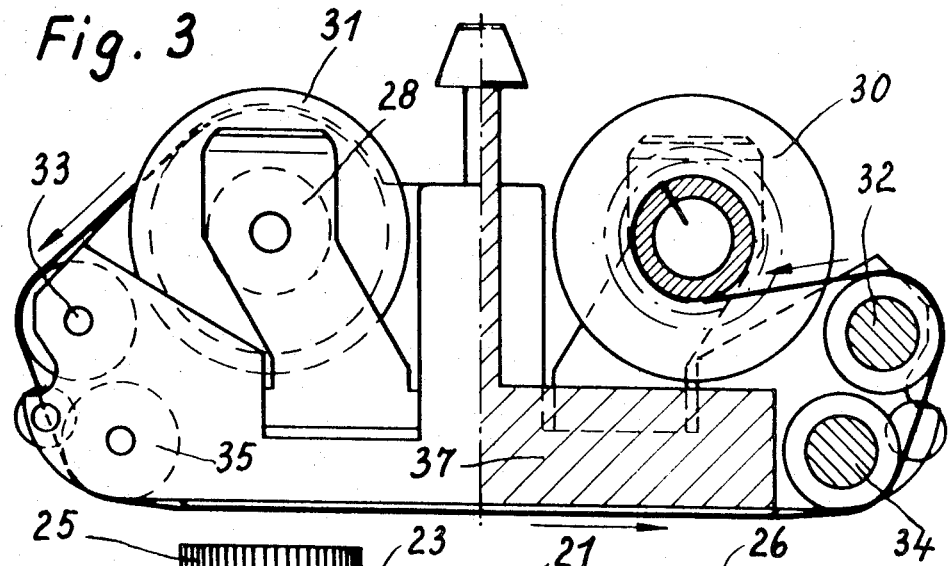
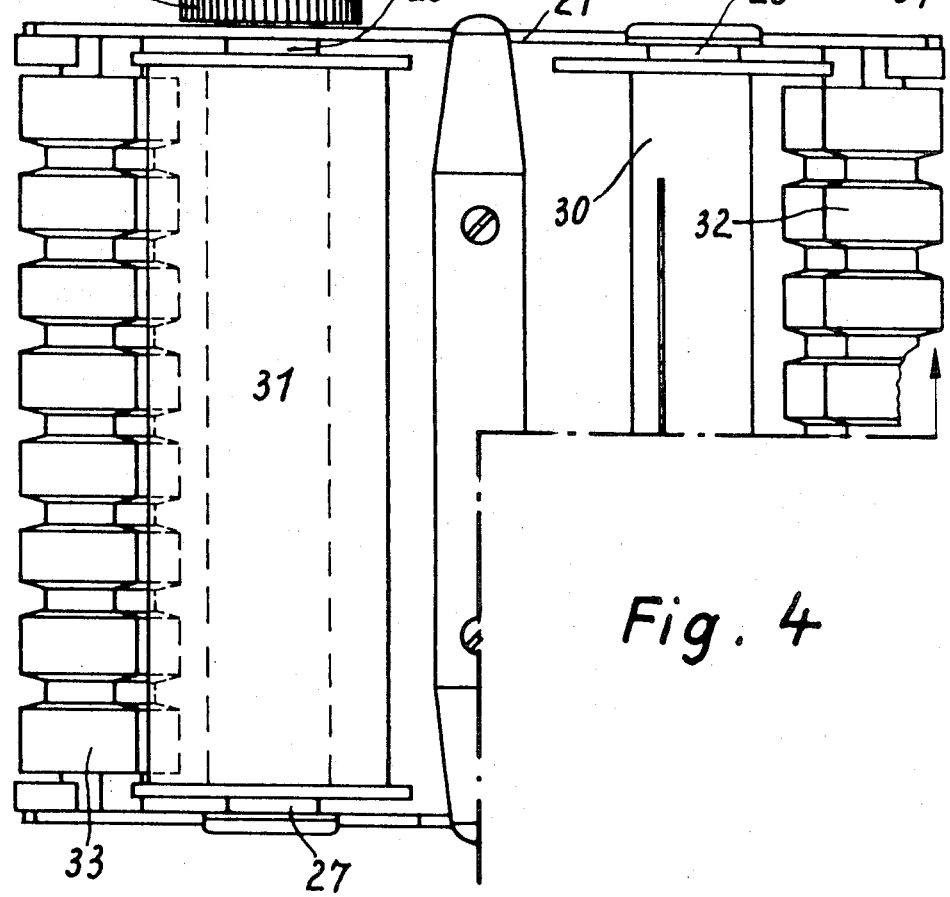

SPOOL HOLDER FOR ROLL FILM CAMERAS

BACKGROUND OF THE INVENTION

In a conventional roll film camera, the film from a supply spool is drawn past the exposure area in the focal plane of the camera and then is wound up on a take-up spool. When the film on the supply spool is all used up and has been entirely wound onto the take-up spool, the take-up spool is then removed from the camera (the sensitive film being protected by the usual opaque paper backing or at least an opaque paper leader strip) in order to be processed. The former supply spool, now empty, is removed from its mounting pins or stub shafts, and is re-inserted in the camera body in place of the take-up spool which has been removed, so that the former supply spool now becomes the take-up spool for the next film to be exposed. This transfer of the spool from one location to a different location in the camera is tedious and time-consuming.

In some cameras, the spools are not mounted directly in the camera body itself, but are mounted in a separate back section or cassette. However, the same operation of transferring the empty supply spool to a new location to constitute the take-up spool for the next film, is still required. There are, of course, other types of cameras in which the film, withdrawn from a small light-tight cassette, is wound onto a take-up spool and then, when all the exposures have been completed, is rewound back into the cassette, while the take-up spool remains permanently in place in the camera and never has to be shifted from one position to another, but this is an entirely different type of camera and offers no solution to the spool shifting problem encountered in ordinary roll film cameras where the film is not rewound onto the original supply spool when the exposures have been completed.

SUMMARY OF THE INVENTION

The present invention provides a small frame or holder which carries the two spools (supply spool and take-up spool) and which is so constructed that it can be very quickly inserted into or removed from the camera body (or from a detachable back section of the camera body) while the spools are in place in the holder or frame. Moreover, the holder can be inserted in the camera in either one of two positions reversed end for end with respect to each other; that is, rotated 180° about the optical axis. Each spool location has a driving key for engaging the end of the spool to drive it, and an associated gear to be driven by a gear in the camera body when the spool is in the take-up position, the other spool (in the supply position) being free to rotate. When a fresh film is on one of the spools, with the end of the leader strip or backing paper threaded through the usual diametrical slot in the other spool, the spool holder is to be inserted in the camera in such position of orientation that the gear on the driving key cooperating with the take-up spool meshes with the driving gear in the camera body. Operation of the camera will then feed the film onto the take-up spool, until finally the supply spool is empty. The entire spool holder or frame is then removed from the camera as a unit, with the two spools still mounted on it, but with all of the film, now fully exposed, wound onto the take-up spool, the original supply spool being now empty. The take-up spool is then removed from the holder or frame, so that the exposed film may be processed. A new roll of film is inserted into the holder, in the position from which the take-up spool was removed, and the end of the protective paper is threaded through the diametrical slot in the other spool. The holder is then inserted in the camera in the opposite position of orientation; that is, turned 180° about the optical axis, with respect to the former position. Thus the driving gear on the driving key of the other spool now meshes with the driving gear in the camera, so that the spool that was previously the supply spool now becomes the take-up spool for the next film.

In this way, changes of film can be made much more rapidly than with the conventional construction, since it is necessary to take out only the full spool of exposed film, and insert another full spool of unexposed film, without having to handle the empty spool to shift it from one position to another. Moreover, the invention has the further advantage that the user of the camera may have a supply of several of these spool holders or frames, all previously loaded with fresh film. Then when one film has been completely exposed, it is the work of but a moment to take out the spool holder and lay it aside, and immediately insert in the camera another duplicate spool holder already loaded with film, so that the change from a fully exposed film to a fresh film is possible in a very few seconds.

The spool holder may be in the form of a rather open frame, merely having the necessary structural parts to hold the two spools, and being intended to be protected from light by other camera parts such as a hinged back door or cover on the camera, after the holder is inserted in the camera. Or, on the other hand, the spool holder may have an opaque back wall which itself constitutes the back wall of the camera when the holder is mounted thereon.

BRIEF DESCRIPTION OF THE DRAWINGS

FIG. 3 is a schematic side view, with parts in section, of a second embodiment of the invention; and FIG. 4 is a fragmentary rear view of the same.

DESCRIPTION OF THE PREFERRED EMBODIMENTS

Figure 1:
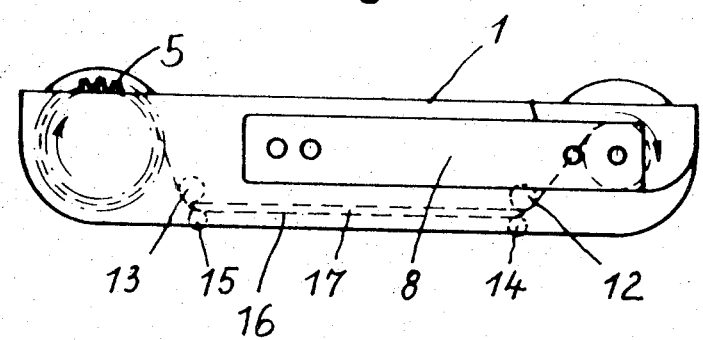
FIG. 1 is a schematic side view of a spool holder or frame according to one embodiment of the invention.
Figure 2:
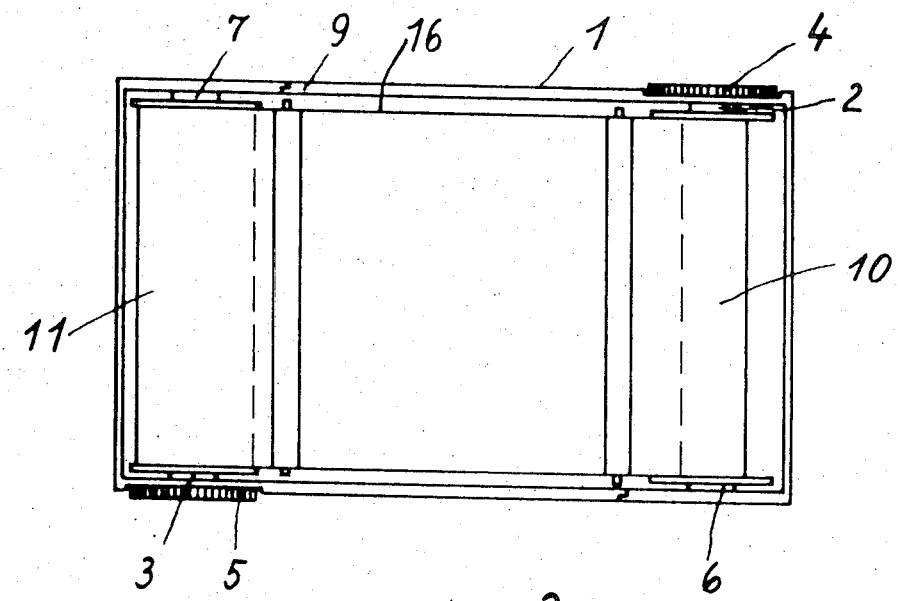
FIG. 2 is a front view of the same.

Referring first to the embodiment illustrated in FIGS. 1 and 2, the holder or frame indicated in general at 1 is provided, at diagonally opposite corners, with film spool keys 2 and 3 rotatably mounted and connected to spur gears 4 and 5, respectively. The keys 2 and 3 are of the conventional kind to fit a slot in the end of a film spool, to form a rotary driving connection with the film spool. Either the gear 4 or the gear 5 (depending upon which way the holder is oriented) is designed to mesh with a driving gear in the camera body, when the holder is properly inserted in the body (or in a detachable back or cassette for use with a camera body).

The film spool pins 6 and 7, axially opposite the respective keys 2 and 3, are carried by one end of spring strips 8 and 9, respectively, the opposite end of each spring strip being riveted, welded, or otherwise secured to the side wall of the holder 1. Thus by flexing the free end of the spring strip outwardly (axially with respect to its associated spool 10 or 11, respectively) a spool may be inserted in or removed from the holder.

Guide rollers 12 and 13 engaging the front of the film and associated rollers 14 and 15 engaging the rear face of the film, serve to guide the film 16 in a plane which, when the holder is inserted in the camera, corresponds to the focal plane or film gate of the camera. A pressure plate 17 may be provided behind the film at the exposure area or film gate location, if desired.

Assuming that the spool 10 is empty and is to constitute the take-up spool during exposure of the next film, a new unexposed roll of film will be inserted in the location 11. The strip of protective paper is drawn between the rollers 13, 15, and the rollers 12–14, and is threaded through the usual diametrical slot in the take-up spool 10. The frame can then be carried separately from the camera until an exposed film has to be removed and replaced. The frame is then inserted in the camera in place of the similar frame removed from the camera, taking care to turn the inserted frame to such position of orientation that the gear 4 associated with the take-up spool, rather than the gear 5 associated with the full spool, will mesh with the driving gear of the film advancement mechanism in the camera body.

When a holder or frame containing a fully exposed film has been removed from the camera, the film will have been unwound from the supply spool and will be wound up on the take-up spool. It is then only necessary to extract the spool containing the exposed film, after which the holder is immediately available to receive a new unexposed spool of film, and the spool which has previously served as the supply spool can now be used as the take-up spool, inserting the holder or carrier in the camera in a position reversed end for end with respect to the position it previously occupied in the camera.

FIGS. 3 and 4 show a second embodiment of the invention, in which the spools are situated behind the exposure area or film gate area, rather than at the ends of the exposure area, as in the first embodiment. In this second embodiment, the holder is shown in general at 21, and the winding keys 23 are rotatable as before on the side walls of the holder, and are connected to their respective spur gears 25. The bearing pins or stub shafts 27 are mounted as before on leaf springs 28 which may be flexed outwardly to withdraw the pins axially for insertion or removal of spools 30 and 31.

The guide rollers 32, 33, 34, and 35 are situated on both sides of the exposure area or film gate area, so that the film is free between them and can be pressed onto the aperture frame of the image area or gate by a pressure plate 37 which is resiliently mounted for movement relative to the holder frame in a direction perpendicular to the plane of the film in the image area.

As the holder or carrier is made so that it may be inserted in the camera (or into a camera cassette) in two different positions of orientation 180° from each other, there is some risk that it might be inserted incorrectly, in a position where the film winding gear in the camera meshes with the gear of the supply spool rather than the gear of the take-up spool. This risk is slight, but to eliminate it all together the construction may include a feeler bar or sensor in the vicinity of the supply spool, the larger diameter of this supply spool (as compared with the smaller initial diameter of the take-up spool), holding the feeler bar in a position which will not obstruct insertion of the holder in the proper position of orientation, but would obstruct insertion in the reverse position.

What is claimed is:

1. A spool holder for roll film cameras, attachable to and removable as a unit from a camera of the type having a film advance gear, said holder comprising a frame, means on said frame for removably mounting two film spools for rotation relative to said frame, two spool keys rotatably mounted on said frame for driving engagement with the respective spools, and two coupling elements, one operatively connected to each spool key to drive such spool key, one coupling element being positioned to engage and be driven by a film advance gear of a camera while the spool holder is attached to the camera in a first position of orientation, the other coupling element being positioned to engage and be driven by the same film advance gear of the camera while the spool holder is attached to the camera in a reversed second position of orientation turned 180° with respect to said first position of orientation.

2. A holder as defined in claim 1, wherein one of said coupling elements is adjacent one lateral edge of said frame and the other coupling element is adjacent the opposite lateral edge of said frame.

3. A holder as defined in claim 1, wherein each of said coupling elements is a spur gear, one or the other of such gears being arranged to mesh with a film advance gear in the camera when said spool holder is applied to the camera in one or the other of its two operative positions.

4. A holder as defined in claim 1, wherein said means for mounting said spools includes two pins, one at the opposite end of each spool from its respective key, each of said pins being resiliently mounted to yield axially away from its spool to enable insertion and removal of a spool between a key and its respective pin.

5. A holder as defined in claim 1, further including film guide rollers (12–15 or 32–35) for guiding film in an image plane.

6. A holder as defined in claim 5, wherein said two spools (10, 11) are located substantially at opposite ends of the holder frame, beyond the limits of an image area in which exposure is effected.

7. A holder as defined in claim 5, wherein said two spools (30, 31) are located behind an image area in which exposure is effected, in partially overlapping relation to such image area.

8. A holder as defined in claim 5, wherein said film guide rollers include film guide rollers (32, 34 and 33, 35) at opposite ends of an image area in which exposure is effected, and wherein the distance between the axes of the film guide rollers at opposite ends of said image area is greater than the distance between the axes of the two film spools.

9. A holder as defined in claim 8, wherein said holder is equipped with its own resiliently mounted film pressure plate (37) mounted for movement relative to the holder frame in a direction perpendicular to the plane of the film in the image area.

* * * * *

UNITED STATES PATENT OFFICE
CERTIFICATE OF CORRECTION

Patent No. 3,780,635         Dated December 25, 1973

Inventor(s) Claus Prochnow

It is certified that error appears in the above-identified patent and that said Letters Patent are hereby corrected as shown below:

On the cover sheet, in the heading insert --[30] Foreign Priority Data:   Germany    April 27, 1971    P 21 20 488.6 --

Signed and sealed this 30th day of April 1974.

(SEAL)
Attest:

EDWARD M. FLETCHER, JR.          C. MARSHALL DANN
Attesting Officer                Commissioner of Patents